H. E. BURNS.
PIPE JOINT.
APPLICATION FILED DEC. 11, 1916.
1,230,375.
Patented June 19, 1917.
2 SHEETS—SHEET 1.
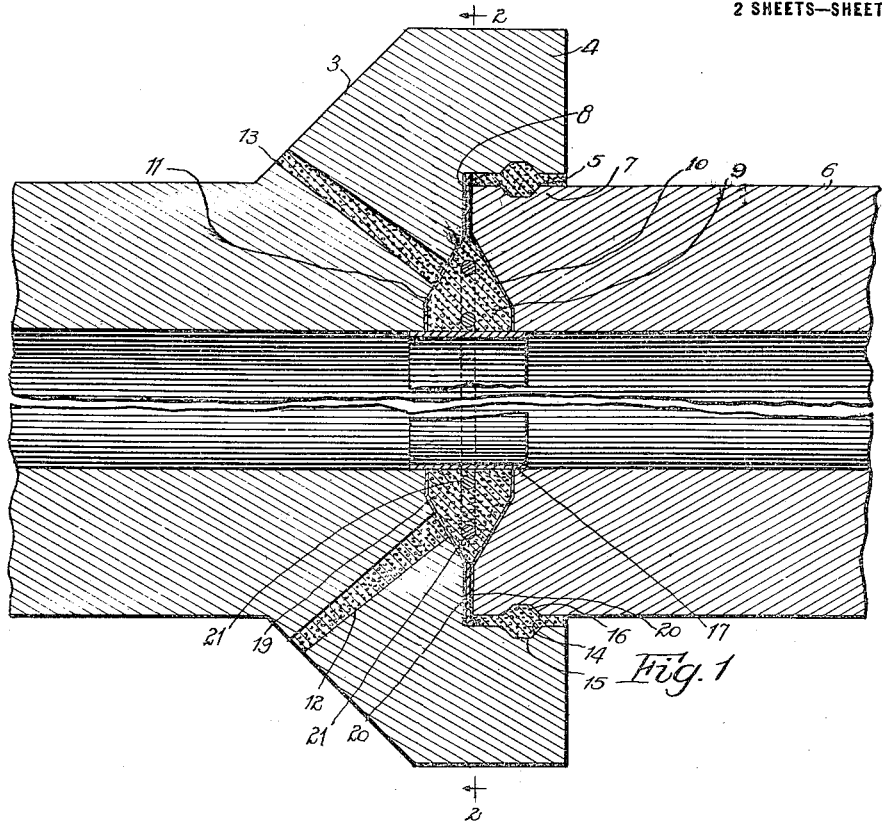
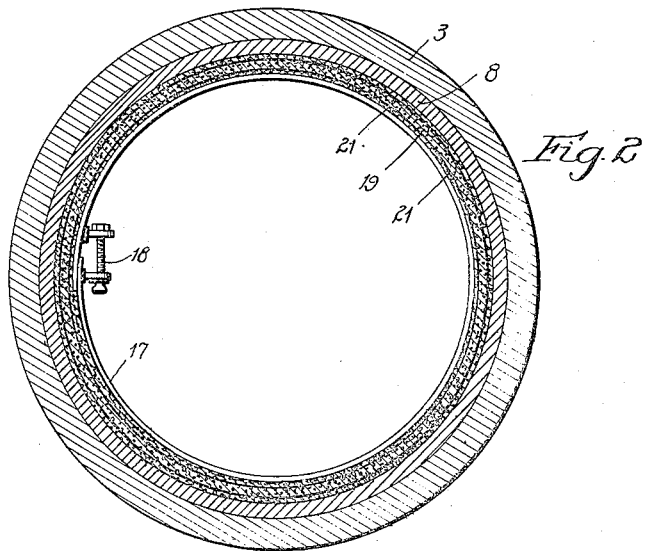
Witnesses:
Albin Cahlberg.
Robert P. Bracke
Inventor
Howard E. Burns
By Williams, Bradbury &c,
Attorneys

UNITED STATES PATENT OFFICE.

HOWARD E. BURNS, OF CHICAGO, ILLINOIS, ASSIGNOR TO C. F. MASSEY COMPANY, OF CHICAGO, ILLINOIS, A CORPORATION OF ILLINOIS.

PIPE-JOINT.

1,230,375.   Specification of Letters Patent.   Patented June 19, 1917.

Application filed December 11, 1916. Serial No. 136,231.

*To all whom it may concern:*

Be it known that I, HOWARD E. BURNS, a citizen of the United States, residing at Chicago, in the county of Cook and State of Illinois, have invented a certain new and useful Improvement in Pipe-Joints, of which the following is a full, clear, concise, and exact description, reference being had to the accompanying drawings, forming a part of this specification.

My invention relates to improvements in pipe joints and particularly to that class of pipe joints commonly known as spigot and faucet joints.

It is one of the objects of the present invention to provide a tight spigot and faucet joint and to accomplish this object I provide between the two pipe sections a mastic filler and a wedge shaped ring arranged when subjected to pressure from within the pipes to press against the mastic filler and force the filler to expand to tightly seal the space between the two adjoining pipe sections.

These and other objects of my invention will be more fully brought out in connection with the accompanying drawings, wherein—

Figure 1 is a vertical sectional view of two adjoining pipe sections showing one form of joint constituting my invention;

Fig. 2 is a transverse sectional view taken along the line 2—2 of Fig. 1, looking in the direction indicated by the arrows.

Similar characters of reference refer to similar parts in both views.

Figure 3:
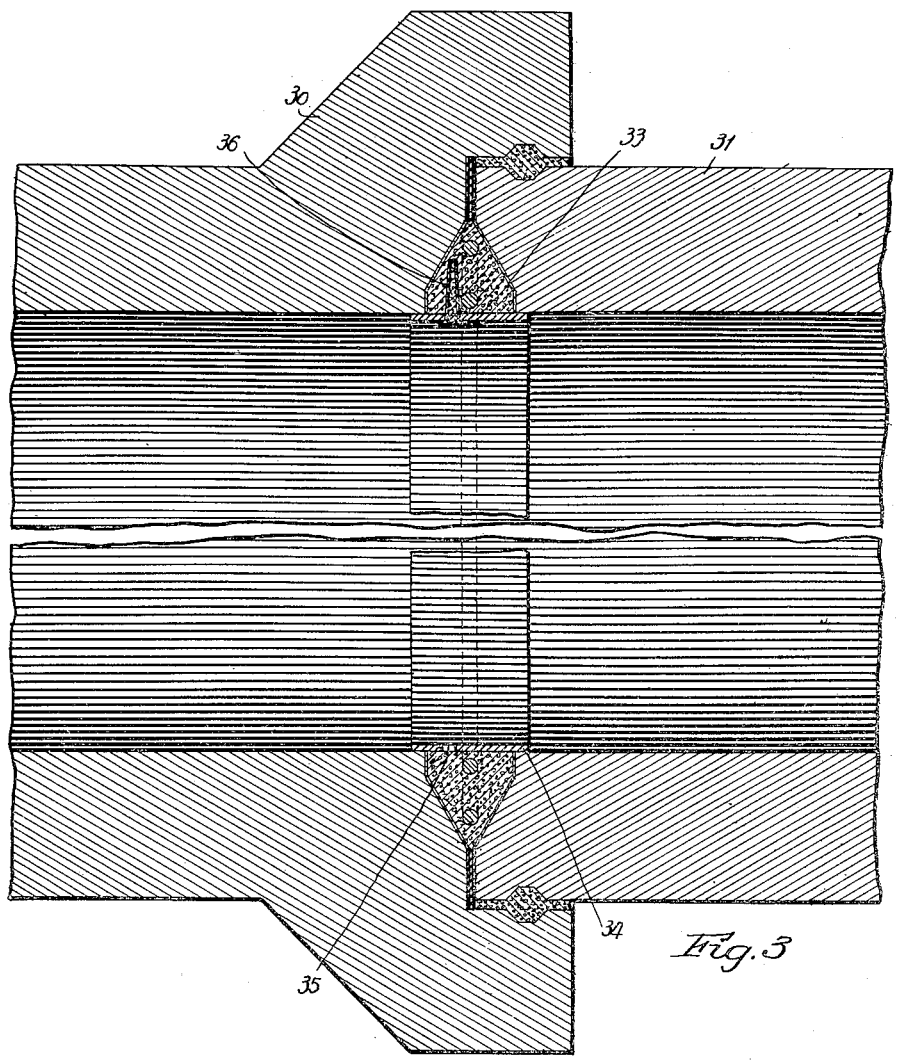
Fig. 3 is a view similar to Fig. 1 showing two adjoining pipe sections embodying a joint constituting the preferred form of my invention.

Referring first to Fig. 1, 3 illustrates a pipe section preferably constructed of clay or some similar material having it's right hand end 4, (Fig. 1) enlarged as shown and provided with the socket shown at 5. The pipe section 6 is constructed exactly as is the section 3 and contains at its left hand end the spigot 7 fitting into the socket 5 of the pipe section 3. Interposed between the two pipe sections 3 and 6 is a mastic filler or washer 8 extending entirely around the annular space provided between the two pipe sections. The adjacent edges of the pipe sections 3 and 6 are formed so as to provide the annular wedge shaped recess 9 extending inwardly from the filler 8 and having the apex of the wedge disposed directly against the inner side of the mastic filler or washer 8. Before assembling the pipe sections 3 and 6 the walls 10 and 11 of the wedge shaped annular recess are coated with a bituminous or tar filler. This may be accomplished by means of a brush or any convenient means.

Extending through the pipe section 3 and communicating with the wedge shaped recess 9 is a bore 12 preferably tapered outwardly as shown in the drawings. A second bore 13 is provided substantially diametrically opposite the bore 12, the bore 13 also tapering outwardly as shown. 14 illustrates a locking key formed of mortar or cement and extending into the annular grooves 15 and 16 provided respectively in the pipe sections 3 and 6. This key arrangement prevents the separation of the pipe sections.

After the coatings 10 and 11 have been applied to the sections 3 and 6 and the pipe sections united as shown in Fig. 1 with the filler 8 between them and the locking key 14 in place the pipe is allowed to set for a period of time. After such time has expired the pipe is entered by the workman and the expansible and contractible form 17 placed around the inside of the pipe sections so as to cover the annular recess 9 as illustrated. Grout is then forced through the bore 12 into the wedge shaped recess 9. After the recess becomes filled the grout starts to pass outwardly through the bore 13, and when this occurs the workman is notified that the annular recess 9 is filled. The form 17 may then be removed by means of the bolt 18 which is turned to cause contraction of the form 17 to permit such removal. Due to the tapering form of the bores 12 and 13 the grout will be held in place and will not be permitted to crumble away or fall out of the bores.

On account of the bituminous coatings 10 and 11 the wedge shaped grout filling 19 is prevented from adhering to the pipe sections 3 and 6, so that when pressure is applied to the inside of the pipe sections the grout filling 19 will be forced outwardly against the mastic filler 8 to tightly seal the space between the pipe sections. It will be observed therefore that the joint between the pipes is made tighter as the pressure within the pipes is increased.

In order to hold the mastic filler in its annular or washer shape while it is being transported or before it is inserted between two pipe sections the filler contains a plurality of cloth or fiber layers shown at 20—20 which serve to reinforce the mastic filler so that the washer is comparatively rigid and can be handled to advantage. To reinforce the grout filling 19 two or more reinforcing metallic rings 21—21 may be embedded in the grout, this being accomplished by inserting the rings into the annular space 9 before the grout is forced into the space.

Referring now to Fig. 3, which illustrates the preferred form of my invention, 30 and 31 illustrate adjoining pipe sections corresponding with the pipe sections 3 and 6 of Fig. 1. In the construction shown in this figure the bores 12 and 13 shown in Fig. 1 are dispensed with and to fill the wedge shaped recess 33 with grout the form 34 is provided with an opening 35 and an outwardly projecting tube 36 disposed substantially diametrically opposite the hole 35. In filling the recess 33 grout is forced through the opening 35 until it starts to come out of the recess through the tube 36. The form 34 may then be removed and the opening provided by the tube 36 plugged up in any suitable manner. This construction makes it possible to do all the work necessary to fill the recess 33 from the inside of the pipe, which is accomplished after the pipe sections have been allowed to set with the mastic filler and the locking key in place.

Although I have referred to the wedge shaped filling as a grout filling I wish it to be understood that any other suitable material may be employed, such as asphalt, tar, sand, etc., in fact anything which will expand upon being subjected to pressure from within the pipe.

Having thus described my invention, what I claim as new and desire to secure by Letters Patent of the United States is:

1. In a spigot and faucet pipe joint the provision of an annular wedge shaped recess formed between the pipe sections and having its apex directed outwardly away from the interior of the pipe and its opposite side communicating with the interior of the pipe, a grout filling in said recess, and a mastic filler between the pipe sections and disposed around the apex of the recess whereby expansion of the grout filling produces compression of the mastic filler to provide a tight joint between the pipe sections.

2. In a pipe joint the provision of an annular wedge shaped grout filling having its apex directed away from the interior of the pipe and its opposite side subjected to pressure within the pipe and a mastic filler between the pipe sections and disposed around the apex of the wedge shaped filling whereby expansion of the grout filling produces compression of the mastic filler to provide a tight joint between the pipe sections.

3. In a spigot and faucet joint the provision of an annular wedge shaped recess formed between the pipe sections and having its apex directed outwardly away from the interior of the pipe and its opposite side communicating with the interior of the pipe, a bituminous coating on the walls of the recess, a grout filling in the recess, and a mastic filler between the pipe sections and disposed around the apex of the recess whereby it is caused to expand and provide a tight joint between the pipe sections when compressed by the wedge shaped grout filling.

4. In a spigot and faucet joint the provision of an annular wedge shaped recess formed between the pipe sections and having its apex directed outwardly away from the interior of the pipe and its opposite side communicating with the interior of the pipe, a bituminous coating on the walls of the recess, a grout filling in the recess, a mastic filler between the pipe sections and disposed around the apex of the recess whereby it is caused to expand and provide a tight joint between the pipe sections when compressed by the wedge shaped grout filling, and a locking key between the pipe sections to prevent relative longitudinal movement of the pipes.

5. A spigot and faucet pipe joint containing a mastic filler between the ends of the pipe sections and an expansible wedge shaped grout ring arranged when subjected to pressure within the pipe to force the mastic filler tightly into engagement with the ends of the pipe sections and the flange of the female pipe section.

6. A spigot and faucet pipe joint containing a mastic filler between the ends of the pipe sections and an expansible wedge shaped ring arranged when subjected to pressure from within the pipe to force the mastic filler tightly into engagement with the ends of the pipe sections and the flange of the female pipe section.

7. In a spigot and faucet pipe joint the provision of an annular wedge shaped recess formed between the pipe sections and having its apex directed outwardly away from the interior of the pipe and its opposite side communicating with the interior of the pipe, a filling in said recess, and a mastic filler between the pipe sections and disposed around the apex of the recess whereby expansion of the filling produces compression of the mastic filler to provide a tight joint between the pipe sections.

8. A spigot and faucet pipe joint comprising a mastic filler between the ends of the pipe sections and an expansible ring arranged when subjected to pressure within the pipe to force the mastic filler tightly into engagement with the ends of the pipe sections and the flange of the female pipe section.

9. In a spigot and faucet joint the provision of an annular wedge shaped recess formed between the pipe sections and having its apex directed outwardly away from the interior of the pipe and its opposite side communicating with the interior of the pipe, a bituminous coating on the walls of the recess, a filling in the recess, and a mastic filler between the pipe sections and disposed around the apex of the recess whereby it is caused to expand and provide a tight joint between the pipe sections when compressed by the wedge shaped filling.

In witness whereof, I hereunto subscribe my name this 2nd day of December, A. D. 1916.

HOWARD E. BURNS.

Witnesses:
A. G. McCaleb,
Robert F. Bracke.